(12) United States Patent
Najmi

(10) Patent No.: US 9,971,877 B1
(45) Date of Patent: May 15, 2018

(54) MANAGING PLAN PROBLEMS ACROSS PLANNING CYCLES

(75) Inventor: Adeel Najmi, Plano, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1859 days.

(21) Appl. No.: 10/165,640

(22) Filed: Jun. 7, 2002

(51) Int. Cl.
*G06F 21/10* (2013.01)

(52) U.S. Cl.
CPC .................................. *G06F 21/10* (2013.01)

(58) Field of Classification Search
None
See application file for complete search history.

(56) References Cited

U.S. PATENT DOCUMENTS

| | | | | |
|---|---|---|---|---|
| 5,016,170 | A * | 5/1991 | Pollalis et al. | 705/7 |
| 5,623,580 | A * | 4/1997 | Inoue et al. | 706/46 |
| 5,692,125 | A * | 11/1997 | Schloss et al. | 705/9 |
| 5,774,866 | A * | 6/1998 | Horwitz et al. | 705/7 |
| 5,845,258 | A * | 12/1998 | Kennedy | 705/8 |
| 6,032,121 | A * | 2/2000 | Dietrich et al. | 705/8 |
| 6,038,540 | A * | 3/2000 | Krist et al. | 705/8 |
| 6,434,440 | B1 * | 8/2002 | Teranishi et al. | 700/97 |
| 6,505,145 | B1 * | 1/2003 | Bjornson | 702/185 |
| 6,581,048 | B1 * | 6/2003 | Werbos | 706/23 |

(Continued)

OTHER PUBLICATIONS

Thomas et al., "Coordinated supply chain management", European Journal of Operational Research 94 (1996), pp. 1-15.*
Bonte et al., "Planning as heuristic search", Artificial Intelligence 129 (2001), pp. 5-33.*
MacDuffie, "The Road to "Root Cause": Shop-Floor Problem-Solving at Three Auto Assembly Plants", Institute for Operations Research and Management Sciences, vol. 43, Apr. 1997*

*Primary Examiner* — Thomas L Mansfield
(74) *Attorney, Agent, or Firm* — Spencer Fane LLP; Steven J. Laureanti

(57) ABSTRACT

A method for managing plan problems across planning cycles includes accessing a first plan generated in a first planning session of a first planning cycle, identifying one or more first plan problems reflected in the first plan, and storing and persisting plan problem data associated with the one or more first plan problems for access in one or more successive planning cycles. The method includes accessing a second plan generated in a second planning session of a second planning cycle subsequent to the first planning cycle, identifying one or more second plan problems reflected in the second plan, and comparing the one or more first plan problems identified for the first planning cycle with the one or more second plan problems identified for the second planning cycle. The method includes determining, for each second plan problem identified for the second planning cycle, whether the second plan problem corresponds to any first plan problem identified for the first planning cycle. The method includes updating the plan problem data for the corresponding first plan problem to reflect the identification of the second plan problem for the second planning cycle if a second plan problem identified for the second planning cycle corresponds to a first plan problem identified for the first planning cycle. The method includes storing and persisting plan problem data associated with the new plan problem for access in one or more successive planning cycles if a second plan problem identified for the second planning cycle is a new plan problem not corresponding to a first plan problem identified for the first planning cycle.

41 Claims, 3 Drawing Sheets

(56) References Cited

U.S. PATENT DOCUMENTS

| | | | |
|---|---|---|---|
| 6,731,998 B2* | 5/2004 | Walser et al. | 700/99 |
| 6,892,192 B1* | 5/2005 | Geddes et al. | 706/14 |
| 6,938,081 B1* | 8/2005 | Mir | 709/223 |
| 7,024,371 B2* | 4/2006 | Ojha et al. | 705/8 |
| 7,047,208 B1* | 5/2006 | Nelson et al. | 705/7.29 |
| 7,058,587 B1* | 6/2006 | Horne | 705/7 |
| 2002/0019759 A1* | 2/2002 | Arunapuram et al. | 705/7 |
| 2002/0099587 A1* | 7/2002 | Kakihana et al. | 705/7 |
| 2003/0004656 A1* | 1/2003 | Bjornson | 702/34 |
| 2003/0149578 A1* | 8/2003 | Wong | 705/1 |
| 2003/0208392 A1* | 11/2003 | Shekar et al. | 705/8 |

* cited by examiner

⑫.Five.Two  User: John Staringindablu    Log Out | Help

◉ Master Planning: Plan > Review > Planner Dashboard > Demand Problems – Short

- Solutions
  ◇ Master Planning

- Workflows
  + S & OP
  + Configuration
  - Plan
  - Review
  - Root Cause Analysis
  - Collaborate
  - Publish
- Favorites Select All Short Problems 10(39) ▼

| | Demand ID | Status | Priority | Shortage | Item | Customer | Location | Requested Quantity | Planned Quantity | Type | Problem Origination Date |
|---|---|---|---|---|---|---|---|---|---|---|---|
| ✓ | Req123 | New | 2 | 5000 | SRAM-1 | OEM-1 | DC1 | 10000 | 5000 | Actual | 02/15/02 |
| ✓ | Req334 | New | 2 | 4000 | SRAM-2 | OEM-2 | DC2 | 8000 | 4000 | Actual | 02/15/02 |
| ✓ | Req124 | New | 2 | 200 | SRAM-1 | OEM-1 | DC11 | 2000 | 1000 | Actual | 02/15/02 |
| ✓ | Req126 | New | 2 | 3000 | SRAM-3 | OEM-1 | DC13 | 6000 | 3000 | Actual | 02/08/02 |
| ✓ | Req127 | New | 2 | 100 | SRAM-4 | OEM-1 | DC12 | 2000 | 1000 | Actual | 02/08/02 |
| ✓ | Req120 | New | 5 | 1100 | SRAM-3 | OEM-1 | DC11 | 4000 | 2000 | Actual | 02/08/02 |
| ☐ | Req132 | Reviewed | 5 | 300 | SRAM-4 | OEM-3 | DC1 | 1000 | 700 | Actual | 01/21/02 |
| ☐ | Req144 | Reviewed | 5 | 200 | SRAM-4 | OEM-4 | DC1 | 1000 | 800 | Actual | 01/21/02 |
| ☐ | Req145 | Reviewed | 5 | 100 | SRAM-4 | OEM-5 | DC11 | 1000 | 900 | Forecast | 02/08/02 |
| ☐ | Req234 | Reviewed | 6 | 400 | SRAM-3 | OEM-1 | DC4 | 3400 | 3000 | Forecast | 02/08/02 |

Root Cause – Constraint View | Root Cause – Demand View | Plan

MANAGING PLAN PROBLEMS ACROSS PLANNING CYCLES

TECHNICAL FIELD OF THE INVENTION

This invention relates generally to business planning and more particularly to managing plan problems across planning cycles.

BACKGROUND OF THE INVENTION

Supply chain planning applications develop production and distribution plans to attempt to match supply with demand to meet business objectives. Today supply chains are often extremely complex, including large networks of manufacturing facilities, distribution facilities, and sales channels spread around the world. As a result, a supply chain plan may include a large number of problems, such as late orders, short orders, overutilized or underutilized resources, safety stock violations, or other problems. It is typically the responsibility of a planner to minimize such problems by investigating their root causes and instituting corrective action. Supply chain planning and other advanced planning system applications typically provide a "problem window" that presents problems in a given plan, which are typically categorized according to type and prioritized according to severity. However, there are several shortcomings associated with such applications. As an example, such applications may not account for the fact that problems may have lifecycles such that they repeatedly arise in successive planning cycles. As another example, such applications may not account for the fact that actions taken to correct such problems may similarly have effects in successive planning cycles. As another example, reconciling the results of a current plan with those of previous plans using such applications may require direct comparisons between stored plans, which are limited in their ability to give insight into the root causes of problems, particularly over long periods of time. As yet another example, such applications may provide no way to efficiently identify and prioritize critical root causes of problems across a supply chain. Previous approaches to dealing with these and other shortcomings include prioritizing and filtering problems and then working on the more important problems in a planning cycle and ignoring the less important problems, increasing time intervals between planning sessions to give planners more time to work on problems, and increasing the number of planners working on problems to allow for greater coverage. Such approaches are often inadequate.

SUMMARY OF THE INVENTION

According to the present invention, disadvantages and problems associated with previous planning techniques may be reduced or eliminated.

In one embodiment of the present invention, a method for managing plan problems across planning cycles includes accessing a first plan generated in a first planning session of a first planning cycle, identifying one or more first plan problems reflected in the first plan, and storing and persisting plan problem data associated with the one or more first plan problems for access in one or more successive planning cycles. The method includes accessing a second plan generated in a second planning session of a second planning cycle subsequent to the first planning cycle, identifying one or more second plan problems reflected in the second plan, and comparing the one or more first plan problems identified for the first planning cycle with the one or more second plan problems identified for the second planning cycle. The method includes determining, for each second plan problem identified for the second planning cycle, whether the second plan problem corresponds to any first plan problem identified for the first planning cycle. The method includes updating the plan problem data for the corresponding first plan problem to reflect the identification of the second plan problem for the second planning cycle if a second plan problem identified for the second planning cycle corresponds to a first plan problem identified for the first planning cycle. The method includes storing and persisting plan problem data associated with the new plan problem for access in one or more successive planning cycles if a second plan problem identified for the second planning cycle is a new plan problem not corresponding to a first plan problem identified for the first planning cycle.

Particular embodiments of the present invention may provide one or more technical advantages. In particular embodiments, data reflecting plan problems may be stored and persisted across a number of planning cycles. In particular embodiments, such plan problem data may be accessible to both planning and execution domains, providing more efficient integration between such domains. Particular embodiments may allow planners to better track plan problems and track and manage actions taken to correct plan problems across planning cycles. In particular embodiments, planners may maintain action and history logs associated with a plan problem, an associated physical entity, or both. Particular embodiments may allow planners to determine whether certain plan problems have been reviewed since the plan problems first occurred or since recent changes in the plan problem occurred. For example, a plan problems may be reconciled with one or more plan problems in one or more subsequent plans (which plan problems may be considered the same as the previous plan problem if their implicit identity is the same), a plan problem in a current plan that does not match one or more persisted plan problems may be marked "new," a plan problem may be marked "old" or "unchanged" if a magnitude of the plan problem has not changed significantly according to a threshold specified by a user, and a plan problem may be marked "changed" if a magnitude of the plan problem has changed significantly according to a threshold specified by a user. In particular embodiments, the persisted plan problem data may include data reflecting actions taken to correct plan problems. Particular embodiments may allow planners to tie task management solutions (such as, for example, task ownership, delegation, escalation, and review) to the management of actions taken to correct plan problems associated with plan execution. Particular embodiments may allow planners to store plan problem records corresponding to plan problems, entities associated with such plan problems, or both. Particular embodiments may allow planners to increase the frequency of planning sessions, which may result in increased responsiveness to plan problems. Particular embodiments may provide closed-loop problem management, which may provide a single, seamless solution bringing together supply chain planning and supply chain execution management. In particular embodiments, planners may manage planning decisions, actions, and monitoring of plan execution in a single paradigm.

Particular embodiments may automatically diagnose root causes of plan problems, such as late or short orders. For example, root causes of demand-related problems may be identified by simulating a replan of a selected set of demands while allowing violations of material, capacity, or other constraints. Violated constraints may be flagged as root causes of the demand-related problems. Particular embodiments may further identify the most critical constraints (which may include root causes that are causing a substantial number of plan problems in comparison with other root causes) together with their impact on the plan. A constraint may show up as a root cause of more than one plan problem. Identified constraints may be presented in relation to the total set of plan problems with which they are associated, which may facilitate identification of critical constraints in a supply chain. Particular embodiments may display such critical constraints using tables, Pareto or other graphs, or both to facilitate understanding and corrective action. Particular embodiments may provide a simple and intuitive way to quickly identify root causes of problems across a supply chain. Providing such diagnostic capabilities has been a compelling problem for some time, but an effective solution to this problem has previously been unavailable.

Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 2 illustrates an example plan problem display of example plan problem records;

DESCRIPTION OF EXAMPLE EMBODIMENTS

Figure 1:
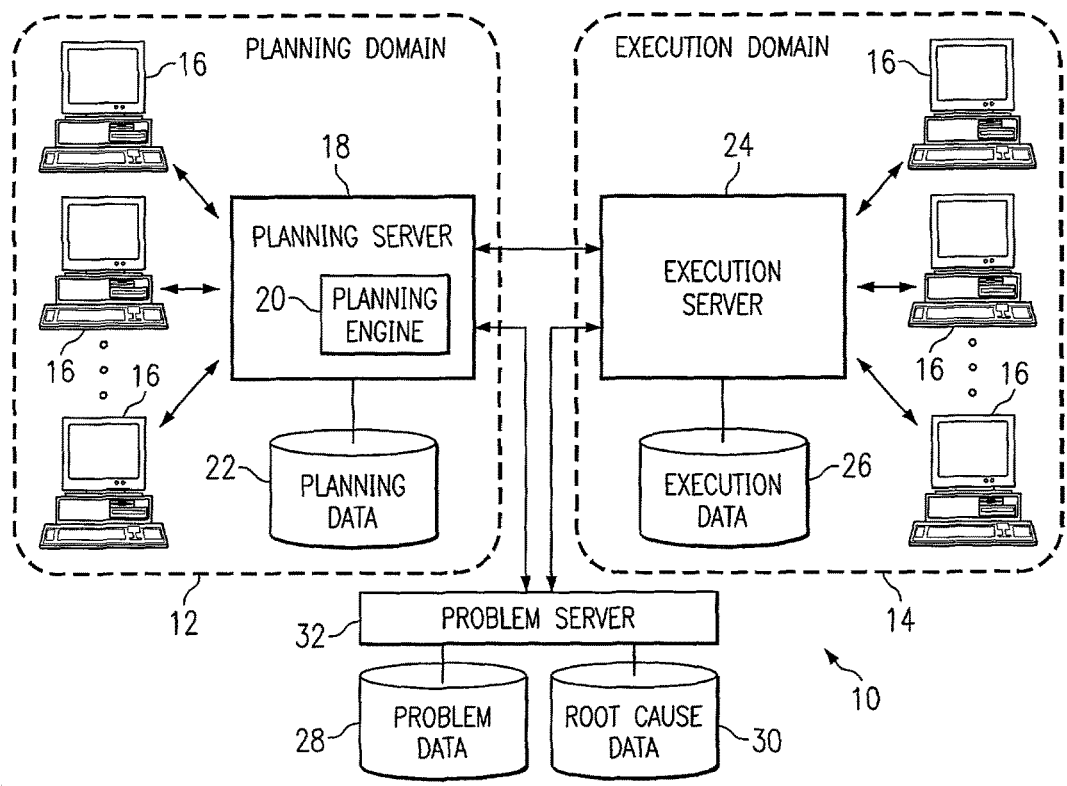
FIG. 1 illustrates an example system for managing plan problems across planning cycles.

FIG. 1 illustrates an example system 10 for managing plan problems across planning cycles. System 10 may include one or more planning domains 12 and one or more execution domains 14. A planning domain 12 may include a domain in which plans (which may include supply chain plans, factory plans, or any other suitable plans) may be generated, and an execution domain 14 may include any suitable domain in which such plans may be executed in whole or in part. Planning domain 12 may include a number of user systems 16 which may provide users within planning domain 12 access to planning server 18. A user within planning domain 12 may be referred to as a "planner" and may include a person handling planning or one or more related tasks within planning domain 12. A user within planning domain 12 may in addition or as an alternative include a computer system programmed to autonomously handle planning or one or more related tasks within planning domain 12. Planning server 18 may support one or more planning engines 20 which may generate plans based on inputs received from planners and from execution domain 14, as described more fully below. Planning data 22 within planning domain 12 may include data reflecting plans generated by planning engine 20 and may be used by planners within planning domain 12 according to particular needs. In general, a planning cycle may include a planning session and a period of time separating the planning session from a following planning session. A plan problem may include a late or short planned order, an overutilized resource, a safety stock violation, or any other plan problem.

Execution domain 14 may include a number of user systems 16 which may provide users within execution domain 14 access to execution server 24. Execution server 24 may support one or more manufacturing execution systems (MESs), enterprise resource planning (ERP) systems, order management systems (OMSs), accounting systems, or other suitable systems. In addition or as an alternative to supporting such systems, execution server 24 may provide access to execution data 16. A user within execution domain 14 may include a person handling execution of a plan or portion of a plan within execution domain 14. A user within execution domain 14 may in addition or as an alternative include a computer system programmed to autonomously handle execution of a plan or portion of a plan within execution domain 14. Execution data 26 may include data reflecting the status of orders or other demands, data reflecting availability and use of resources available within execution domain 14 (such as item inventories, factory, machine, warehouse, or carrier capacities, and other suitable resources), and any other suitable data associated with execution of one or more plans within execution domain 14. Items may include products, component parts, materials, or any other suitable items. Execution data 26 may be used for any suitable purpose. For example, execution data 26 may be used within execution domain 14 to execute a plan and may be shared among a number of different execution domains 14 to execute a plan spanning execution domains 14. Planning engine 20 may also use execution data 26 to generate a plan, as described more fully below. Planning engine 20 may access execution data 26 via execution server 24 using one or more links, which may each include one or more computer buses, local area networks (LANs), metropolitan area networks (MANs), wide area networks (WANs), portions of the Internet, or any other appropriate wireline, optical, wireless, or other links.

In a planning session, a planner may access planning engine 20 within planning server 18 via a user system 16, provide inputs specifying one or more goals (such as maximization of throughput, minimization of costs, or any other suitable goals), and cause planning engine 20 to generate a plan according to the inputs for execution within one or more execution domains 14. To generate the plan, planning engine 20 may access execution data 26 reflecting resources available within each execution domain 14. By accessing execution data 26, planning engine may obtain a "snapshot" of conditions within execution domain 14. The availability of particular resources within particular execution domains 14 may be limited and may thus impose one or more constraints on the plan, which planning engine 20 may take into account when generating the plan (in which case the plan may be referred to as a "constrained" plan) and which may result in the plan including one or more plan problems. After the plan has been generated, it may be communicated to one or more execution domains 14 for execution.

As a result of imposed constraints, for example, the plan may include one or more late or short planned orders. As an example only and not by way of limitation, a constraint may include an upper limit on the number of items that may be transported between two locations (which limit may, for example, be a function of a total number of vehicles available to transport such items and the carrying capacities of the vehicles). When such a plan problem occurs (for example, a late order), the planner may attempt to make one or more ad hoc fixes to correct it. For example, the planner may contact a person within an execution domain 14 and request the person to take specific action to modify one or more constraints causing the plan problem to occur. However, the ad hoc fix may not correct the plan problem (for example, the order may still be late). As an example, the person within execution domain 14 may attempt to take the requested action to modify certain constraints, but may ultimately be unable to do so to the extent necessary to resolve the plan problem.

After the plan has been generated and communicated to one or more execution domains 14 for execution, a period of time may pass before the next planning session and the start of the next planning cycle. Any suitable period of time may separate successive planning sessions from each other. For example, planning sessions may occur daily, weekly, or otherwise. In the next planning session, the planner may again access planning engine 20 within planning server 18 via a user system 16, provide inputs specifying one or more goals, and cause planning engine 20 to generate a plan according to the inputs for execution within one or more execution domains 14. If one or more plan problems resulted in the previous planning cycle, the planner may according to previous techniques directly compare the current plan with the previous plan to determine the status of the plan problems. For example, the planner may determine whether a late order may be filled earlier or even later according to the current plan in comparison with the previous plan. Based on such comparisons, the planner may be able to determine whether an ad hoc fix made by the planner in the previous planning cycle had any effect on a plan problem. However, making such comparisons may require a great deal of time and effort on the part of the planner, may be plagued by human error, and may provide limited insight into the plan problem. New plan problems may also be reflected in the current plan, which the planner may address by attempting to make ad hoc fixes to correct them, as described above.

Traditionally, planning domains 12 and execution domains 14 have been substantially separate from each other, there being little or no integration between them. Such separation between planning domains 12 and execution domains 14 may have several disadvantages. As an example, useful information regarding a plan generated within a planning domain 12 may be unavailable to users within an execution domain 14 handling execution of the plan. Such unavailable information may include information reflecting one or more reasons for planning decisions made within planning domain 14, such that users within execution domain 14 may lack an understanding of the context of a plan handed to them from planning domain 12. As another example, useful information that may explain the limited availability of particular resources within execution domain 14 may be unavailable to planners within planning domain 12. Without such information, the planners may doubt the accuracy of execution data 26 received from execution domain 14 and modify plans generated within planning domain 12 accordingly.

As another example, planners within planning domain 12 may be unable to readily track a particular plan problem as plans affecting the plan problem are executed within execution domain 14. While such tracking may be possible from within execution domain 14, it may not be possible from within planning domain 12. In particular, planners within planning domain 12 may be unable to readily track plan problems as plans affecting these plan problems are executed. As described above, the planners may directly compare current plans with previous plans to determine the status of plan problems, but such comparisons may require a great deal of time and effort on the part of the planners, may be plagued by human error, and may provide limited insight into the plan problems. Such shortcomings of direct comparisons among plans may be particularly evident where the comparisons are made among a number of plans across a number of planning cycles. As yet another example, planners within planning domain 12 may be unable to readily determine the effect of an ad hoc fix made to correct a plan problem. Action taken to correct a plan problem may not become visible within execution domain 14 for some time after the action is taken, and it may be difficult for planners within planning domain 12 to determine whether the ad hoc fix has been implemented within execution domain 14, the effect of the ad hoc fix, or whether further action needs to be taken to correct the plan problem.

In addition to planning domains 12 and execution domains 14 traditionally being substantially separate from each other, different planning domains 12 have traditionally been substantially separate from each other and different execution domains 14 have traditionally been substantially separate from each other. This may also have several disadvantages. For example, useful information regarding planning decisions made by planners within a first planning domain 12 may be unavailable to planners within a second planning domain 12. Such information may include information reflecting one or more reasons for planning decisions made within the first planning domain 12. Although planning decisions made in the first planning domain 12 may affect planning decisions made in the second planning domain 12, the unavailability of such information may result in planners within the second planning domain 12 lacking an understanding of the context of a plan generated within the first planning domain 12. Similarly, useful information regarding the execution of a plan within one execution domain 14 may be unavailable to users within another execution domain 14.

To provide better integration among planning domains 12 and execution domains 14, plan problem data 28 reflecting plan problems may be stored and persisted such that data 28 may be accessible from within one or more planning domains 12, one or more execution domains 14, or both one or more planning domains 12 and one or more execution domains 14. As described more fully below, root cause data 30 reflecting root causes of plan problems may also be stored and persisted such that data 30 may be accessible from within one or more planning domains 12, one or more execution domains 14, or both one or more planning domains 12 and one or more execution domains 14. Data 28 may be stored using any suitable arrangement. In particular embodiments, for example, data 28 may include a number of plan problem records that each contain data reflecting a corresponding plan problem. A plan problem record may be identified by a plan problem identifier, which might include, for example, an order identifier (such as an order number) identifying a corresponding late, short, or other problem order. A plan problem record may contain any suitable data reflecting a corresponding plan problem. For example, a plan problem record corresponding to a plan problem may contain data reflecting the nature of the plan problem (such as, for example, whether a planned order is late or short), when the plan problem was first detected, a current status of the plan problem, a status history of the plan problem, action taken to resolve the plan problem, expected results of action taken to resolve the plan problem, actual results of action taken to resolve the plan problem, action yet to be taken to resolve the plan problem, and any other suitable data relating to the plan problem that may be useful to planners in one or more planning domains 12, users in one or more execution domains 14, or both.

A plan problem record may be marked to indicate whether a corresponding plan problem is new, whether a planner has reviewed the plan problem record since a corresponding plan problem occurred or since one or more changes in the corresponding plan problem occurred, or both. As an example, a plan problem record corresponding to a newly occurring plan problem may be marked "new," a plan problem record that has not been reviewed by a planner may be marked "unread," a plan problem record that has been reviewed by a planner may be marked "reviewed," and a plan problem record that has been reviewed by a planner and corresponds to a plan problem that has not substantially changed (according to one or more specified thresholds as described more fully below) since a planner last reviewed the plan problem record may be marked "unchanged" or "old." Although particular markings of plan problem records are described, any suitable markings may be used. A plan problem record may be stored and persisted for any suitable amount of time, across any suitable number of planning cycles, and may be modified any suitable number of times during its life. As an example, a plan problem record may be stored and persisted until a corresponding plan problem is filled, at which time the plan problem record may be deleted. As another example, a plan problem record may be stored and persisted indefinitely, which may allow planners to perform later analyses using the plan problem record.

Problem server 32 may provide access to plan problem data 28. In particular embodiments, plan problem server 32 may in addition automatically detect plan problems when they occur and create a corresponding plan problem record. For example, a planned order may be late, short, or both according to a generated plan, as described above. At the time the plan is generated, problem server 32 may automatically detect the problem order and create a corresponding plan problem record. The plan problem record may be marked to indicate that the occurrence of the corresponding problem order is new and that the plan problem record has not yet been reviewed by a planner. In particular embodiments, problem server 32 may create a plan problem record corresponding to a detected plan problem only if the plan problem meets or exceeds a specified threshold. As an example only and not by way of limitation, problem server 32 may create a plan problem record corresponding to a planned late or short order only if the order is two days late or later. Any suitable threshold may be specified such that problem server 32 may filter out plan problems that may be negligible in comparison with plan problems that planners within a planning domain 12 may typically be required to address.

Problem server 32 may additionally detect changes in a plan problem and update a corresponding plan problem record accordingly. For example, a planned order that is late according to a previous plan may be filled earlier or later according to a current plan. Problem server 32 may detect this change in the plan problem and update a corresponding plan problem record accordingly. In particular embodiments, problem server 32 may update a plan problem record to reflect a change in a corresponding plan problem only if the magnitude of the change meets or exceeds a specified threshold. For example, problem server 32 may update a plan problem record corresponding to a problem order that is late to reflect a change in the planned fill date only if the change is two days or greater. Any suitable threshold may be specified such that problem server 32 may filter out changes in plan problems that may be negligible in comparison with changes in plan problems that planners in a planning domain 12 may typically be required to address. In addition or as an alternative to problem server 32 automatically creating plan problem records and automatically updating plan problem records, planners within planning domains 12 and users within execution domains 14 may manually create plan problem records and manually update plan problem records, according to particular needs. As an example, a planner within a planning domain 12 may manually update a plan problem record to reflect one or more planning decisions made within planning domain 12. As another example, a user within an execution domain 14 may update a plan problem record to reflect action taken within execution domain 14 affecting a corresponding plan problem.

Although plan problem data 28, root cause data 30, and problem server 32 are illustrated as being external to one or more planning domains 12 and external to one or more execution domains 14, plan problem data 28, root cause data 30, and problem server 32 may be located within one or more planning domains 12 or one or more execution domains 14. As an example only and not by way of limitation, problem server 32 may in particular embodiments be located within a planning domain 12 and be coupled to or even integrated into a planning server 18 within planning domain 12. Plan problem data 28 and root cause data 30 associated with problem server 32 may also be located within planning domain 12. As another example, problem server 32 may be located within an execution domain 14 and be coupled to or even integrated into an execution server 24. Associated plan problem data 28 and root cause data 30 may also be located within execution domain 14. Although problem server 32, plan problem data 28, and root cause data 30 are described as being located together, problem server 32, plan problem data 28, and root cause data 30 may in particular embodiments be located separate from each other, according to particular needs. As described above, problem server 32, plan problem data 28, and root cause data 30 may in particular embodiments each be accessible from within one or more planning domains 12, one or more execution domains 14, or both. Where problem server 32, plan problem data 28, and root cause data 30 are located within a planning domain 12 or an execution domain 14, problem server 32, plan problem data 28, and root cause data 30 may be nonetheless accessible from one or more other planning domains 12, one or more other execution domains 14, or both. In particular embodiments, problem server 32, plan problem data 28, and root cause data 30 may be located within a number of planning domains 12, execution domains 14, or both. In such embodiments, plan problem data 28 and root cause data 30 within one planning domain 12 or execution domain 14 may be duplicates of plan problem data 28 and root cause data 30 within another planning domain 12 or execution domain 14.

In particular embodiments, access to one or more plan problem records may be restricted. As an example, only particular planners within particular planning domains 12 may be authorized to view one or more plan problem records or make changes to the plan problem records. Similarly, only particular users within particular execution domains 14 may be authorized to view one or more plan problem records or make changes to the plan problem records. Restricting access to one or more plan problem records may increase the accuracy of plan problem data 28 and may help prevent unwanted disclosure of data 28, which may be confidential in nature. Plan problem records may be sorted according to any suitable criteria. As an example only and not by way of limitation, a planner within a planning domain 12 may want to access plan problem records in order of the amount of time or quantity of items by which corresponding problem orders are late or short, respectively. Thus, plan problem records corresponding to current problem orders may be sorted and displayed for the planner according to how late or short the problem orders are.

Sorting plan problem records may help the planner focus on critical plan problems and make better use of limited planning and execution resources when attempting to resolve plan problems. As another example, plan problem records may be sorted according to their status. For example, plan problem records corresponding to plan problems that are new and have not been reviewed by a planner may be displayed first, plan problem records corresponding to plan problems that are not new but have changed and have not since been reviewed by a planner may be displayed second, and plan problem records corresponding to plan problems that are not new and have not changed since they were last reviewed by a planner may be displayed third. Within each of these groups of plan problem records, plan problem records may be sorted according to any suitable criteria (such as how late or short problem orders are, as described above). Although particular sorting criteria are described, the present invention contemplates any suitable sorting criteria.

Plan problem records may be used by any suitable entities within any suitable domains for any suitable purposes. As an example only and not by way of limitation, a planner within a planning domain 12 may use a plan problem record corresponding to a plan problem to record planning decisions made within planning domain 12 affecting the corresponding plan problem, to track the corresponding plan problem as plans affecting it are executed within one or more execution domains 14, to analyze the corresponding plan problem to determine one or more root causes of the plan problem or one or more other plan problems, to determine action already taken to resolve the corresponding plan problem, to determine action yet to be taken to resolve the corresponding plan problem or for any other suitable purpose. In addition, a user within an execution domain 14 may use the plan problem record to determine actions that may need to be taken within execution domain 14 to correct the corresponding plan problem or for any other suitable purpose. Because the plan problem record may be accessible across a number of planning domains 12 and execution domains 14, a planner within one planning domain 12 may use the plan problem record to ascertain one or more planning decisions made within another planning domain 12. Similarly, a user within one execution domain 14 may use the plan problem record to ascertain one or more actions taken within another execution domain 14. As described above, the plan problem record may be stored and persisted for any suitable amount of time, across any suitable number of planning cycles. This may allow planners within planning domains 12 and users within execution domains 14 to use the plan problem record as described above across the lifecycle of the corresponding plan problem and, where appropriate, possibly after the plan problem has been resolved.

FIG. 2 illustrates an example plan problem display 34 of example plan problem records. In particular embodiments, problem server 32 may generate plan problem display 34 at the request of a planner within a planning domain 12 or a user within an execution domain 14. Display 34 may include one or more tables that each include a number of rows 36 and columns 38. An intersection of a row 36 with a column 38 may define a cell. Each row 36 may correspond to a plan problem record, and each column 38 may correspond to a plan problem record field, which may contain particular data reflecting a corresponding plan problem. For example, row 36a may correspond to a plan problem record identified as "Req123" in the cell at the intersection of row 36a with column 38a. Plan problem records shown in display 34 may include any suitable fields. For example, as shown in FIG. 2, a plan problem record for a problem order may include a "Demand ID" field, a "Status" field, a "Priority" field, a "Shortage" field, an "Item" field, a "Customer" field, a "Location" field, a "Requested Quantity" field, a "Planned Quantity" field, a "Type" field, a "Problem Origination Date" field, and any other suitable fields. Although particular fields are illustrated and described, the present invention contemplates plan problem records including any suitable fields containing any suitable information reflecting the corresponding plan problems. Plan problem display 34 may also include one or more view selection icons 46 that, as described more fully below, may be selected to switch between a plan problem display 34 and a root cause display.

Figure 3:
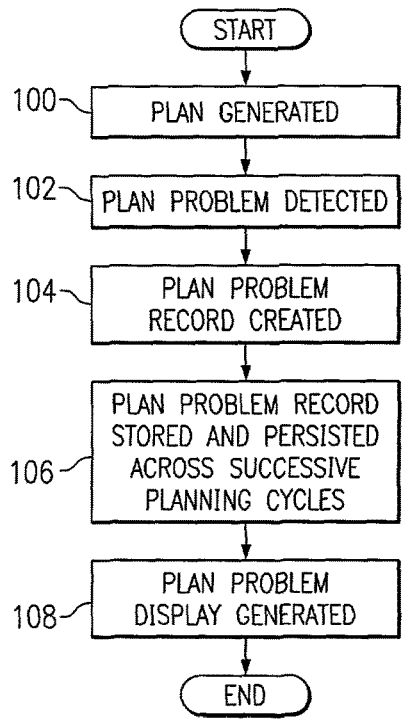
FIG. 3 illustrates an example method for managing plan problems across planning cycles.

FIG. 3 illustrates an example method for managing plan problems across planning cycles. The method begins at step 100, where planning engine 20 generates a plan for execution within one or more execution domains 14. As described above, planning engine 20 may generate the plan based on inputs received from a planner and from execution domain 14. Although particular components are described as performing particular tasks herein, the present invention contemplates any suitable components performing any suitable tasks associated with storing and persisting problem data 28 across a number of planning cycles or in making problem data 28 accessible across a number of different domains. At step 102, problem server 32 detects a plan problem, for example, a planned order that is late, short, or both according to the generated plan. At step 104, problem server 32 creates a plan problem record corresponding to the detected plan problem. As described above, problem server 32 may create the plan problem record only if the detected plan problem meets or exceeds a specified threshold. At step 106, problem server 32 stores and persists the plan problem record across one or more successive planning cycles for later access from within one or more planning domains 12, execution domains 14, or both. Thus, in certain embodiments, planners within planning domains 12 and users within execution domains 14 may access the plan problem record to track the plan problem, to analyze the plan problem, or for any other suitable purpose, as described above. At step 108, problem server 32 generates a plan problem display 34 of the plan problem record and possibly a number of other plan problem records, at which point the method ends. As described above, display 34 may be generated at the request of a planner within a planning domain 12 or a user within an execution domain 14.

Referring again to FIG. 1, root cause data 30 reflecting root causes of plan problems may be stored such that data 30 may be accessible from within one or more planning domains 12, one or more execution domains 14, or both. A root cause of a plan problem may include a constraint, which as described above may include a limited resource within an execution domain 14. Identifying root causes of plan problems may be difficult, particularly using previous techniques. For example, since a number of resources may be used to fill an order and such resources may be shared among a number of orders, a root cause of a problem order may defy ready identification. However, identifying and reducing root causes of plan problems may reduce the occurrence of plan problems and may thus be an important part of planning. The Pareto principle may apply to root causes of plan problems, loosely meaning that approximately twenty percent of the root causes of plan problems may cause approximately eighty percent of the plan problems. Identifying which root causes of plan problems are causing a greater number of plan problems may also be an important part of planning in that it may allow planners to focus on particular root causes of plan problems to more efficiently reduce the occurrence of plan problems.

Root cause data 30 may include any suitable data reflecting root causes of plan problems and may be stored using any suitable data arrangement. In particular embodiments, for example, data 30 may include a number of root cause records that each contain data reflecting a corresponding root cause of one or more plan problems. A root cause record may contain any suitable data reflecting a corresponding root cause of one or more plan problems. For example, a root cause record corresponding to a root cause may contain data reflecting the nature of the particular constraint that is the root cause (such as, for example, whether the constraint is related to capacity or related to item inventory), data identifying the particular constraint that is the root cause, data reflecting one or more plan problems caused by the root cause, and any other suitable data reflecting the root cause. A root cause record may contain data reflecting only one plan problem caused by a corresponding root cause. Alternatively, a root cause record may contain data reflecting a number of plan problems caused by a corresponding root cause, possibly even all plan problems caused by the corresponding root cause. Root cause data 30 may be used by any suitable entities within any suitable domains for any suitable purposes. As an example only and not by way of limitation, a planner within a planning domain 12 may use a number of root cause records corresponding to root causes of a number of plan problems to identify constraints within one or more execution domains 14 that are causing a substantial number of plan problems and focus on such constraints to more efficiently reduce the occurrence of plan problems. As another example, a user within an execution domain 14 may use one or more root cause records corresponding to root causes of one or more plan problems in connection with a review of the historical operation of execution domain 14 to improve one or more aspects of the operation. Although particular uses of root cause data 30 are described, the present invention contemplates any suitable uses of such data 30.

In particular embodiments, access to one or more root cause records may be restricted. As an example, only particular planners within particular planning domains 12 may be authorized to view one or more root cause records or make changes to the root cause records. Similarly, only particular users within particular execution domains 14 may be authorized to view one or more root cause records or make changes to the root cause records. Restricting access to one or more root cause records may increase the accuracy of root cause data 30 and may help prevent unwanted disclosure of data 30, which may be confidential in nature.

Problem server 32 may, in response to user input or automatically in response to generation of a plan at planning server 18, determine one or more root causes of a plan problem. A planning engine 20 within a planning domain 12 may generate a first plan according to which a planned order is late, short, or both. As described above, applicable constraints may be taken into account in generating the first plan, and one or more of the constraints may include a root cause (which may not yet be identified) of the plan problem. To determine one or more root causes of the plan problem, problem server 32 may access the first plan and request panning engine 20 to generate a second plan in which one or more of the constraints (preferably all the constraints) taken into account in the first plan are not taken into account. Since one or more constraints are not taken into account in the second plan, the second plan may be referred to as an "unconstrained plan." As a result of the removal of the constraints in generating the second plan, the plan problem may not occur in the second plan. For example, a planned order that is late according to the first plan may be filled on time according to the second plan. Problem server 32 may access the second plan and compare the first plan with the second plan to determine one or more differences between the first and second plan, which differences may highlight, reflect, or otherwise be used to identify one or more root causes of the plan problem in the first plan. Problem server 32 may automatically or in response to user input create one or more root cause records corresponding to the identified root causes.

Figure 4:
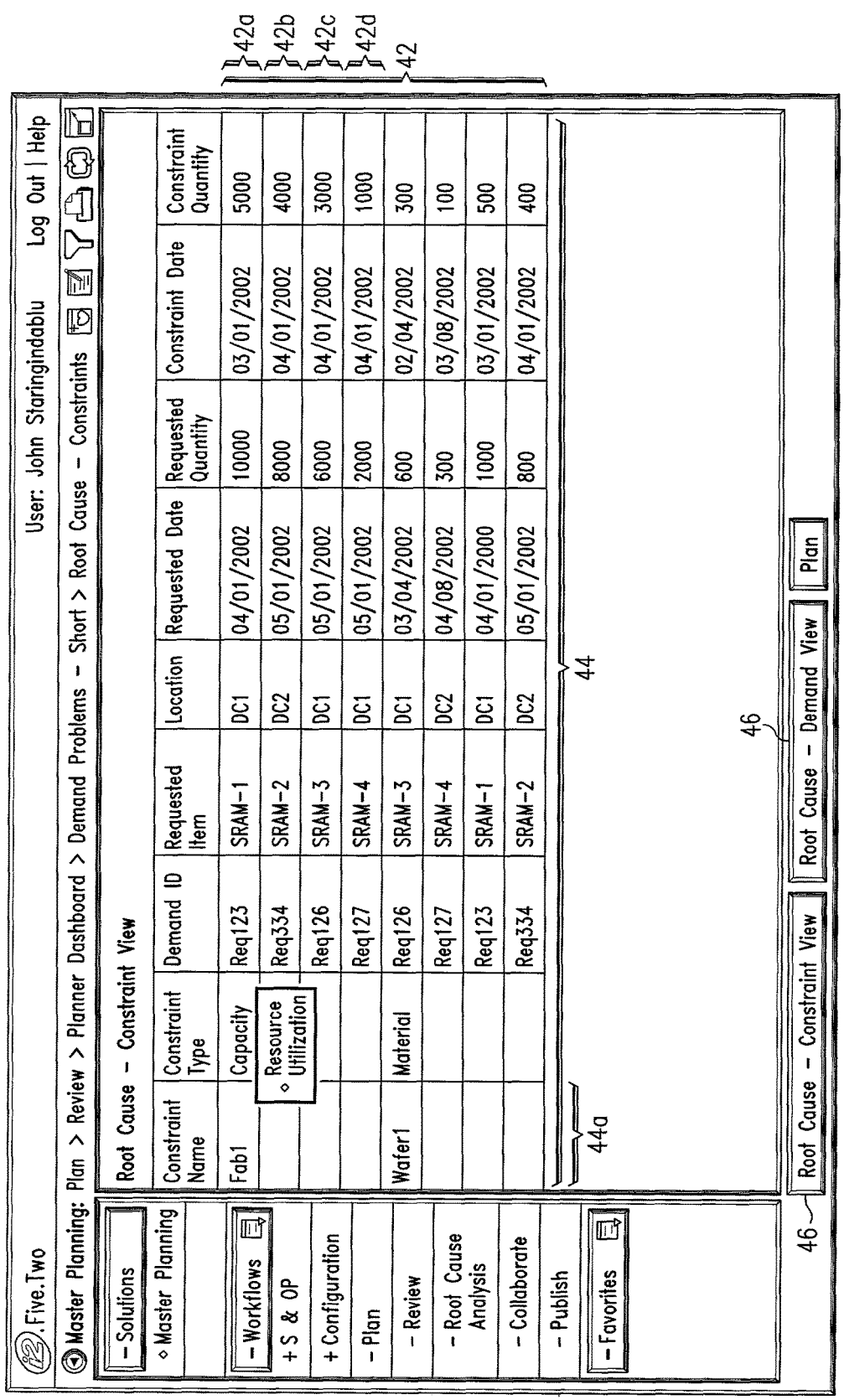
FIG. 4 illustrates an example root cause display of example root cause records.

FIG. 4 illustrates an example root cause display 40 of example root cause records. In particular embodiments, problem server 32 may generate root cause display 40 at the request of a planner within a planning domain 12 or a user within an execution domain 14. Root cause display 40 may include one or more tables that each include a number of rows 42 and columns 44. An intersection of a row 42 with a column 44 may include a cell. Each column 44 may correspond to a root cause record field, which may contain particular data reflecting root causes of plan problems. Each row 42 may correspond to a single root cause record. For example, row 42a may correspond to a root cause record identified as "Fab1" in the cell at the intersection of row 42a with column 44a, which record may contain data reflecting a single plan problem. Alternatively, a single root cause record may span a number of rows 42. For example, rows 42a through 42d may together make up a single root cause record identified as "Fab1" in the cell at the intersection of row 42a with column 44a, which record may contain data reflecting four different plan problems caused by a root cause corresponding to the root cause record "Fab1." Root cause records shown in display 40 may include any suitable fields. For example, as shown in FIG. 4, a root cause record may include a "Constraint Name" field, a "Constraint Type" field, a "Demand ID" field, a "Requested Item" field, a "Location" field, a "Requested Date" field, a "Requested Quantity" field, a "Constraint Date" field, a "Constraint Quantity" field, and any other suitable field. Although particular fields are illustrated and described, the present invention contemplates root cause records including any suitable fields containing any suitable information reflecting corresponding root causes of plan problems.

Root cause display 40 may be linked to plan problem display 34 such that a planner within a planning domain 12 or a user within an execution domain 14 accessing plan problem display 34 or root cause display 40 may selectively alternate between the two displays 34 and 40 to view plan problem records and root cause records corresponding to each other. For example, plan problem display 34 and root cause display 40 may each include one or more view selection icons 46 that, when selected, may refer a planner or user to root cause display 40 or plan problem display 34, respectively.

In addition or as an alternative to data reflecting root causes of plan problems being displayed using root cause display 40, such data may be displayed using one or more Pareto or other graphs which may facilitate identification of one or more root causes of plan problems that are causing a substantial number of plan problems relative to other root causes of plan problems. Such graphs may be included in plan problem display 34, root cause display 40, or in a separate display. In particular embodiments, such a display may be generated by problem server 32 at the request of a planner within a planning domain 12 or a user within an execution domain 14.

Root causes, root cause records, or both may be sorted within display 40 according to any suitable criteria. As an example only, root causes may be sorted and prioritized according to a number of plan problems caused by each of the root causes. The root causes may then be displayed for a planner within a planning domain 12 or a user within an execution domain 14 using display 40 according to the number of plan problems caused by each of the root causes. In addition or as an alternative to the root causes being displayed using display 40, root cause records corresponding to the root causes may be displayed using a Pareto or other graph according to the number of plan problems caused by each of the root causes. Although particular sorting criteria are described, the present invention contemplates any suitable combination of any suitable sorting criteria. Sorting root causes, root cause records, or both may facilitate identification of one or more critical constraints that are causing a substantial number of plan problems, which may allow a planner within a planning domain 12 or a user within an execution domain 14 to focus on the critical constraints to more efficiently reduce the occurrence of plan problems.

Figure 5:
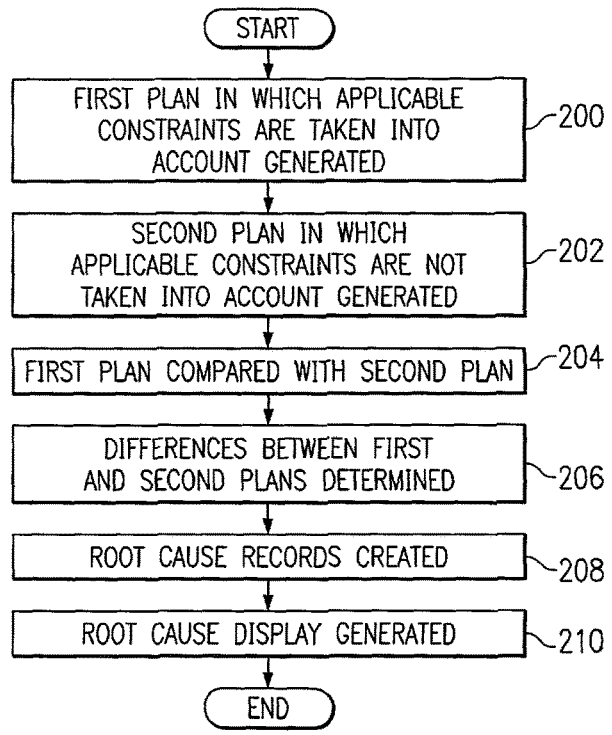
FIG. 5 illustrates an example method for identifying one or more root causes of a plan problem.

FIG. 5 illustrates an example method for determining one or more root causes of a plan problem. The method begins at step 200, where a planning engine 20 generates a first plan in which all applicable constraints are taken into account. The first plan may include one or more plan problems. For example, a planned order may be late, short, or both according to the first plan. At step 202, planning engine 20 generates a second plan in which the constraints taken into account in the first plan are not taken into account. As described above, planning engine 20 may generate the second plan in response to a request from a problem server 32. As a result of the removal of the constraints in the second plan, the plan problem may not occur in the second plan. At step 204, problem server 32 compares the first plan with the second plan. At step 206, problem server 32 determines one or more differences between the first and second plan, which differences may highlight, reflect, or otherwise be used to identify one or more root causes of the plan problem in the first plan, at which point the method ends. As described above, the one or more identified constraints may each include a root cause of the plan problem. At step 208, problem server 32 may automatically or in response to user input create one or more root cause records reflecting the one or more identified root causes of the plan problem. At step 210, problem server 32 generates a root cause display 40 of the root cause record and possibly a number of other root cause records, at which point the method ends. Particular embodiments of the present invention may provide one or more technical advantages. In particular embodiments, data reflecting plan problems may be stored and persisted across a number of planning cycles. In particular embodiments, such plan problem data may be accessible to both planning and execution domains, providing more efficient integration between such domains. Particular embodiments may allow planners to better track plan problems and track and manage actions taken to correct plan problems across planning cycles. In particular embodiments, planners may maintain action and history logs associated with a plan problem, an associated physical entity, or both. Particular embodiments may allow planners to determine whether certain plan problems have been reviewed since the plan problems first occurred or since recent changes in the plan problem occurred. For example, a plan problems may be reconciled with one or more plan problems in one or more subsequent plans (which plan problems may be considered the same as the previous plan problem if their implicit identity is the same), a plan problem in a current plan that does not match one or more persisted plan problems may be marked "new," a plan problem may be marked "old" or "unchanged" if a magnitude of the plan problem has not changed significantly according to a threshold specified by a user, and a plan problem may be marked "changed" if a magnitude of the plan problem has changed significantly according to a threshold specified by a user. In particular embodiments, the persisted plan problem data may include data reflecting actions taken to correct plan problems. Particular embodiments may allow planners to tie task management solutions (such as, for example, task ownership, delegation, escalation, and review) to the management of actions taken to correct plan problems associated with plan execution. Particular embodiments may allow planners to store plan problem records corresponding to plan problems, entities associated with such plan problems, or both. Particular embodiments may allow planners to increase the frequency of planning sessions, which may result in increased responsiveness to plan problems. Particular embodiments may provide closed-loop problem management, which may provide a single, seamless solution bringing together supply chain planning and supply chain execution management. In particular embodiments, planners may manage planning decisions, actions, and monitoring of plan execution in a single paradigm.

Particular embodiments may automatically diagnose root causes of plan problems, such as late or short orders. For example, root causes of demand-related problems may be identified by simulating a replan of a selected set of demands while allowing violations of material, capacity, or other constraints. Violated constraints may be flagged as root causes of the demand-related problems. Particular embodiments may further identify the most critical constraints (which may include root causes that are causing a substantial number of plan problems in comparison with other root causes) together with their impact on the plan. A constraint may show up as a root cause of more than one plan problem. Identified constraints may be presented in relation to the total set of plan problems with which they are associated, which may facilitate identification of critical constraints in a supply chain. Particular embodiments may display such critical constraints using tables, Pareto or other graphs, or both to facilitate understanding and corrective action. Particular embodiments may provide a simple and intuitive way to quickly identify root causes of problems across a supply chain. Providing such diagnostic capabilities has been a compelling problem for some time, but an effective solution to this problem has previously been unavailable.

Certain embodiments may provide all, some, or none of these technical advantages, and certain embodiments may provide one or more other technical advantages. Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A supply chain planning system, comprising:
a supply chain network comprising one or more supply chain entities;
a supply chain planning engine comprising a non-transitory computer-readable storage medium;
an execution domain comprising a non-transitory computer-readable storage medium that stores an item inventory and execution data indicating an availability of items in the item inventory; and
a problem server comprising a processor and a non-transitory computer-readable storage medium and a graphical user interface, the problem server configured to:
access over a computer network a first supply chain plan generated by the supply chain planning engine in a first planning session of a first planning cycle and based on the execution data;
identify one or more first plan problems reflected in the first supply chain plan;
store and persist plan problem data based on the one or more first plan problems for access in one or more successive planning cycles;
access over the computer network a second supply chain plan generated by the planning engine in a second planning session of a second planning cycle subsequent to the first planning cycle and based on the execution data, the second planning session separated by a period of time from the first planning session and wherein one or more constraints associated with the first supply chain plan are not associated with the second supply chain plan;
identify one or more second plan problems reflected in the second supply chain plan;
automatically compare the one or more first plan problems identified for the first planning cycle with the one or more second plan problems identified for the second planning cycle to determine for each second plan problem identified for the second planning cycle whether the second plan problem corresponds to any first plan problem identified for the first planning cycle;
when a second plan problem identified for the second planning cycle corresponds to a first plan problem identified for the first planning cycle, update the plan problem data for the corresponding first plan problem to reflect the identification of the second plan problem for the second planning cycle;
when a second plan problem identified for the second planning cycle is a new plan problem not corresponding to a first plan problem identified for the first planning cycle, store and persist plan problem data associated with the new plan problem for access in one or more successive planning cycles;
identify a root cause of one or more plan problems and store root cause data such that the root cause data is accessible over the computer network from one or more planning domains, the root cause data comprising data reflecting a corresponding root cause of the one or more plan problems;
access the plan problem data associated with the one or more first plan problems and the plan problem data associated with the new plan problem;
generate a plan problem display of the accessed plan problem data in a table format and comprising one or more sort criteria and a view selection icon;
display the plan problem display on the graphical user interface;
in response to a user specifying one or more sort criteria, sort the displayed plan problem data based on the specified criteria;
in response to a user selecting the view selection icon, display a corresponding root cause display of the root cause data associated with the plan problem data in the plan problem display; and
causing at least one of the one or more supply chain entities to access the stored root cause data over the computer network and resolve the one or more plan problems based, at least in part, on the identified root cause.

2. The system of claim 1, wherein the system is further configured to update plan problem data associated with the corresponding first plan problem only when a change has occurred with respect to the corresponding first plan problem that meets or exceeds a specified threshold.

3. The system of claim 1, wherein the system is further configured to store and persist plan problem data associated with a new plan problem only when the new plan problem meets or exceeds a specified threshold.

4. The system of claim 1, wherein a plan problem comprises a planned order that is late, short, or both.

5. The system of claim 1, wherein plan problem data is stored and persisted within a planning domain.

6. The system of claim 1, wherein plan problem data reflecting one or more plan problems is accessible from within one or more planning domains and one or more execution domains.

7. The system of claim 1, wherein plan problem data associated with a plan problem comprises a plan problem record comprising data reflecting one or more of:
a nature of the plan problem;
when the plan problem first occurred;
a current status of the plan problem;
a status history of the plan problem;
action taken to correct the plan problem;
expected results of action taken to correct the plan problem;
actual results of action taken to correct the plan problem; and
action yet to be taken to correct the plan problem.

8. The system of claim 7, wherein the system is further configured to:
sort two or more plan problem records based on one or more specified criteria; and
generate a display of the sorted plan problem records.

9. The system of claim 8, wherein:
the plan problems comprise planned orders that are late or short; and
the server system is further configured to sort the plan problems based on how late or short the planned orders are.

10. The system of claim 7, wherein the system is further configured to mark a plan problem record containing data associated with a plan problem to indicate one or more of:
whether the plan problem is new;
whether a planner has reviewed the plan problem record since the plan problem first occurred; and
whether a planner has reviewed the plan problem record since one or more changes with respect to the plan problem occurred.

11. The system of claim 7, wherein the system is further configured to generate a plan problem display of two or more plan problem records, the plan problem display comprising a table.

12. The system of claim 11, wherein the plan problem display further comprises a first view selection icon to, in response to a user selecting the first view selection icon, cause to be made visible to the user a corresponding root cause display of two or more root cause records associated with the two or more plan problem records in the plan problem display, the root cause display comprising a second view selection icon to, in response to the user selecting the second view selection icon, cause the corresponding plan problem display to be made visible to the user.

13. The system of claim 1, wherein the system comprises first software components executed by a computer system, the first and second supply chain plans are generated by one or more second software components executed by the same computer system.

14. A computer-implemented method, comprising:
storing, by an execution domain comprising a non-transitory computer-readable storage medium, an item inventory and execution data in a database;
accessing, by a supply chain planning engine over a computer network the execution data, the execution data indicating an availability of items in the item inventory;
generating, by the supply chain planning engine comprising a non-transitory computer-readable storage medium, a first supply chain plan in a first planning session of a first planning cycle and based on the execution data;
accessing, by a problem server over the computer network, the first supply chain plan;
identifying, by the problem server comprising a processor and a non-transitory computer-readable storage medium, one or more first plan problems reflected in the first supply chain plan;
storing, by the problem server, and persisting, by the problem server, plan problem data based on the one or more first plan problems for access in one or more successive planning cycles;
generating, by the supply chain planning engine, a second supply chain plan in a second planning session of a second planning cycle subsequent to the first planning cycle, the second planning session separated by a period of time from the first planning session;
accessing, by the problem server over the computer network, the second supply chain plan;
identifying, by the problem server, one or more second plan problems reflected in the second supply chain plan;
automatically comparing, by the problem server, the one or more first plan problems identified for the first planning cycle with the one or more second plan problems identified for the second planning cycle to determine for each second plan problem identified for the second planning cycle whether the second plan problem corresponds to any first plan problem identified for the first planning cycle;
when a second plan problem identified for the second planning cycle corresponds to a first plan problem identified for the first planning cycle, updating, by the problem server, the plan problem data for the corresponding first plan problem to reflect the identification of the second plan problem for the second planning cycle;
when a second plan problem identified for the second planning cycle is a new plan problem not corresponding to a first plan problem identified for the first planning cycle, storing, by the problem server, and persisting, by the problem server, plan problem data associated with the new plan problem for access in one or more successive planning cycles;
identifying, by the problem server, a root cause of one or more plan problems and storing root cause data such that the root cause data is accessible over the computer network from one or more planning domains, the root cause data comprising data reflecting a corresponding root cause of the one or more plan problems;
accessing the plan problem data associated with the one or more first plan problems and the plan problem data associated with the new plan problem;
generating a plan problem display of the accessed plan problem data in a table format and comprising one or more sort criteria and a view selection icon;
displaying the plan problem display on the graphical user interface;
in response to a user specifying one or more sort criteria, sorting the displayed plan problem data based on the specified criteria;
in response to a user selecting the view selection icon, displaying a corresponding root cause display of the root cause data associated with the plan problem data in the plan problem display; and
causing at least one supply chain entity to access the stored root cause data over the computer network and resolve at least one of the one or more plan problems based, at least in part, on the identified root cause.

15. The method of claim 14, comprising updating plan problem data associated with the corresponding first plan problem only when a change has occurred with respect to the corresponding first plan problem that meets or exceeds a specified threshold.

16. The method of claim 14, comprising storing and persisting plan problem data associated with a new plan problem only when the new plan problem meets or exceeds a specified threshold.

17. The method of claim 14, wherein a plan problem comprises a planned order that is late, short, or both.

18. The method of claim 14, wherein plan problem data is stored and persisted within a planning domain.

19. The method of claim 14, wherein plan problem data reflecting one or more plan problems is accessible from within one or more planning domains and one or more execution domains.

20. The method of claim 14, wherein plan problem data associated with a plan problem comprises a plan problem record comprising data reflecting one or more of:
a nature of the plan problem;
when the plan problem first occurred;
a current status of the plan problem;
a status history of the plan problem;
action taken to correct the plan problem;
expected results of action taken to correct the plan problem;
actual results of action taken to correct the plan problem; and
action yet to be taken to correct the plan problem.

21. The method of claim 20, further comprising:
sorting two or more plan problem records based on one or more specified criteria; and
generating a display of the sorted plan problem records.

22. The method of claim 21, wherein:
the plan problems comprise planned orders that are late or short; and
the method comprises sorting the plan problems based on how late or short the planned orders are.

23. The method of claim 20, further comprising marking a plan problem record containing data associated with a plan problem to indicate one or more of:
whether the plan problem is new;
whether a planner has reviewed the plan problem record since the plan problem first occurred; and
whether a planner has reviewed the plan problem record since one or more changes with respect to the plan problem occurred.

24. The method of claim 20, further comprising generating a plan problem display of two or more plan problem records, the plan problem display comprising a table.

25. The method of claim 24, wherein the plan problem display further comprises a first view selection icon to, in response to a user selecting the first view selection icon, cause to be made visible to the user a corresponding root cause display of two or more root cause records associated with two or more plan problem records in the plan problem display, the root cause display comprising a second view selection icon to, in response to the user selecting the second view selection icon, cause the corresponding plan problem display to be made visible to the user.

26. A non-transitory computer-readable storage medium embodied with software, the software when executed using one or more computer systems is configured to:
access a first supply chain plan generated by a planning engine in a first planning session of a first planning cycle and based on execution data indicating an availability of items in an item inventory, the item inventory and execution data stored in an execution domain;
identify one or more first plan problems reflected in the first supply chain plan;
store and persist plan problem data based on the one or more first plan problems for access in one or more successive planning cycles;
access a second supply chain plan generated by the planning engine in a second planning session of a second planning cycle subsequent to the first planning cycle and based on the execution data, the second planning session separated by a period of time from the first planning session and wherein one or more constraints associated with the first supply chain plan are not associated with the second supply chain plan;
identify one or more second plan problems reflected in the second supply chain plan;
automatically compare the one or more first plan problems identified for the first planning cycle with the one or more second plan problems identified for the second planning cycle to determine for each second plan problem identified for the second planning cycle whether the second plan problem corresponds to any first plan problem identified for the first planning cycle;
when a second plan problem identified for the second planning cycle corresponds to a first plan problem identified for the first planning cycle, update the plan problem data for the corresponding first plan problem to reflect the identification of the second plan problem for the second planning cycle;
when a second plan problem identified for the second planning cycle is a new plan problem not corresponding to a first plan problem identified for the first planning cycle, store and persist plan problem data associated with the new plan problem for access in one or more successive planning cycles;
identify a root cause of one or more plan problems and store root cause data such that the root cause data is accessible from one or more planning domains, the root cause data comprising data reflecting a corresponding root cause of the one or more plan problems;
access the plan problem data associated with the one or more first plan problems and the plan problem data associated with the new plan problem;
generate a plan problem display of the accessed plan problem data in a table format and comprising one or more sort criteria and a view selection icon;
display the plan problem display on the graphical user interface;
in response to a user specifying one or more sort criteria, sort the displayed plan problem data based on the specified criteria;
in response to a user selecting the view selection icon, display a corresponding root cause display of the root cause data associated with the plan problem data in the plan problem display; and
cause at least one supply chain entity to access the stored root cause data from the one or more planning domains over the computer network and resolve at least one of the one or more plan problems based, at least in part, on the identified root cause.

27. The non-transitory computer-readable storage medium of claim 26, wherein the software is further configured to update plan problem data associated with the corresponding first plan problem only when a change has occurred with respect to the corresponding first plan problem that meets or exceeds a specified threshold.

28. The non-transitory computer-readable storage medium of claim 26, wherein the software is further configured to store and persist plan problem data associated with a new plan problem only when the new plan problem meets or exceeds a specified threshold.

29. The non-transitory computer-readable storage medium of claim 26, wherein a plan problem comprises a planned order that is late, short, or both.

30. The non-transitory computer-readable storage medium of claim 26, wherein plan problem data is stored and persisted within a planning domain.

31. The non-transitory computer-readable storage medium of claim 26, wherein plan problem data reflecting one or more plan problems is accessible from within one or more planning domains and one or more execution domains.

32. The non-transitory computer-readable storage medium of claim wherein plan problem data associated with a plan problem comprises a plan problem record comprising data reflecting one or more of a nature of the plan problem;
when the plan problem first occurred;
a current status of the plan problem;
a status history of the plan problem;
action taken to correct the plan problem;
expected results of action taken to correct the plan problem;
actual results of action taken to correct the plan problem; and
action yet to be taken to correct the plan problem.

33. The non-transitory computer-readable storage medium of claim 32, wherein the software is further configured to:
sort two or more plan problem records based on one or more specified criteria; and generate a display of the sorted plan problem records for one or more planners.

34. The non-transitory computer-readable storage medium of claim 33, wherein:
the plan problems comprise planned orders that are late or short; and
the software is further configured sort the plan problems based on how late or short the planned orders are.

35. The non-transitory computer-readable storage medium of claim 32, wherein the software is further configured to mark a plan problem record containing data associated with a plan problem to indicate one or more of:
whether the plan problem is new;
whether a planner has reviewed the plan problem record since the plan problem first occurred; and
whether a planner has reviewed the plan problem record since one or more changes with respect to the plan problem occurred.

36. The non-transitory computer-readable storage medium of claim 32, wherein the software is further configured to generate a plan problem display of two or more plan problem records, the plan problem display comprising a table.

37. The non-transitory computer-readable storage medium of claim 36, wherein the plan problem display further comprises a first view selection icon to, in response to a user selecting the first view selection icon, cause to be made visible to the user a corresponding root cause display of two or more root cause records associated with the two or more plan problem records in the plan problem display, the root cause display comprising a second view selection icon to, in response to the user selecting the second view selection icon, cause the corresponding plan problem display to be made visible to the user.

38. The non-transitory computer-readable storage medium of claim 26, comprising first software components executed by a computer system, the first and second supply chain plans being generated by one or more second software components executed by the same computer system.

39. The system of claim 1, wherein the item inventory comprises an item selected from one or more of products, component parts, and materials.

40. The method of claim 14, wherein the item inventory comprises an item selected from one or more of products, component parts, and materials.

41. The non-transitory computer-readable storage medium of claim 26, wherein the item inventory comprises an item selected from one or more of products, component parts, and materials.

* * * * *

UNITED STATES PATENT AND TRADEMARK OFFICE
CERTIFICATE OF CORRECTION

PATENT NO. : 9,971,877 B1
APPLICATION NO. : 10/165640
DATED : May 15, 2018
INVENTOR(S) : Adeel Najmi It is certified that error appears in the above-identified patent and that said Letters Patent is hereby corrected as shown below:

In the Specification

1. Please amend the paragraphs appearing at Column 1, Lines 12-49, as indicated below:

Supply chain planning applications develop production and distribution plans to attempt to match supply with demand to meet business objectives. Today supply chains are often extremely complex, including large networks of manufacturing facilities, distribution facilities, and sales channels spread around the world. As a result, a supply chain plan may include a large number of problems, such as late orders, short orders, overutilized or underutilized resources, safety stock violations, or other problems. It is typically the responsibility of a planner to minimize such problems by investigating their root causes and instituting corrective action.

Supply chain planning and other advanced planning system applications typically provide a "problem window" that presents problems in a given plan, which are typically categorized according to type and prioritized according to severity. However, there are several shortcomings associated with such applications. As an example, such applications may not account for the fact that problems may have lifecycles such that they repeatedly arise in successive planning cycles. As another example, such applications may not account for the fact that actions taken to correct such problems may similarly have effects in successive planning cycles. As another example, reconciling the results of a current plan with those of previous plans using such applications may require direct comparisons between stored plans, which are limited in their ability to give insight into the root causes of problems, particularly over long periods of time. As yet another example, such applications may provide no way to efficiently identify and prioritize critical root causes of problems across a supply chain.
Previous approaches to dealing with these and other shortcomings include prioritizing and filtering problems and then working on the more important problems in a planning cycle and ignoring the less important problems, increasing time intervals between planning sessions to give planners more time to work on problems, and increasing the number of planners working on problems to allow for greater coverage. Such approaches are often inadequate.

Signed and Sealed this
Thirteenth Day of November, 2018

Andrei Iancu
*Director of the United States Patent and Trademark Office*

2. Please amend the paragraphs appearing at Columns 8-9, Lines 56-27, as indicated below:

In particular embodiments, access to one or more plan problem records may be restricted. As an example, only particular planners within particular planning domains 12 may be authorized to view one or more plan problem records or make changes to the plan problem records. Similarly, only particular users within particular execution domains 14 may be authorized to view one or more plan problem records or make changes to the plan problem records. Restricting access to one or more plan problem records may increase the accuracy of plan problem data 28 and may help prevent unwanted disclosure of data 28, which may be confidential in nature.

Plan problem records may be sorted according to any suitable criteria. As an example only and not by way of limitation, a planner within a planning domain 12 may want to access plan problem records in order of the amount of time or quantity of items by which corresponding problem orders are late or short, respectively. Thus, plan problem records corresponding to current problem orders may be sorted and displayed for the planner according to how late or short the problem orders are. Sorting plan problem records may help the planner focus on critical plan problems and make better use of limited planning and execution resources when attempting to resolve plan problems. As another example, plan problem records may be sorted according to their status. For example, plan problem records corresponding to plan problems that are new and have not been reviewed by a planner may be displayed first, plan problem records corresponding to plan problems that are not new but have changed and have not since been reviewed by a planner may be displayed second, and plan problem records corresponding to plan problems that are not new and have not changed since they were last reviewed by a planner may be displayed third. Within each of these groups of plan problem records, plan problem records may be sorted according to any suitable criteria (such as how late or short problem orders are, as described above). Although particular sorting criteria are described, the present invention contemplates any suitable sorting criteria.

3. Please amend the paragraphs appearing at Columns 13-14, Lines 32-37, as indicated below:

FIGURE 5 illustrates an example method for determining one or more root causes of a plan problem. The method begins at step 200, where a planning engine 20 generates a first plan in which all applicable constraints are taken into account. The first plan may include one or more plan problems. For example, a planned order may be late, short, or both according to the first plan. At step 202, planning engine 20 generates a second plan in which the constraints taken into account in the first plan are not taken into account. As described above, planning engine 20 may generate the second plan in response to a request from a problem server 32. As a result of the removal of the constraints in the second plan, the plan problem may not occur in the 30 second plan. At step 204, problem server 32 compares the first plan with the second plan. At step 206, problem server 32 determines one or more differences between the first and second plan, which differences may highlight, reflect, or otherwise be used to identify one or more root causes of the plan problem in the first plan, at which point the method ends. As described above, the one or more identified constraints may each include a root cause of the plan problem. At step 208, problem server 32 may automatically or in response to user input create one or more root cause records reflecting the one or more identified root causes of the plan problem. At step 210, problem server 32 generates a root cause display 40 of the root cause record and possibly a number of other root cause records, at which point the method ends.

Particular embodiments of the present invention may provide one or more technical advantages. In particular embodiments, data reflecting plan problems may be stored and persisted across a number of planning cycles. In particular embodiments, such plan problem data may be accessible to both planning and execution domains, providing more efficient integration between such domains. Particular embodiments may allow planners to better track plan problems and track and manage actions taken to correct plan problems across planning cycles. In particular embodiments, planners may maintain action and history logs associated with a plan problem, an associated physical entity, or both. Particular embodiments may allow planners to determine whether certain plan problems have been reviewed since the plan problems first occurred or since recent changes in the plan problem occurred. For example, a plan problems may be reconciled with one or more plan problems in one or more subsequent plans (which plan problems may be considered the same as the previous plan problem......if their implicit identity is the same), a plan problem in a current plan that does not match one or more persisted plan problems may be marked "new," a plan problem may be marked "old" or "unchanged" if a magnitude of the plan problem has not changed significantly according to a threshold specified by a user, and a plan problem may be marked "changed" if a magnitude of the plan problem has changed significantly according to a threshold specified by a user. In particular embodiments, the persisted plan problem data may include data reflecting actions taken to correct plan problems. Particular embodiments may allow planners to tie task management solutions (such as, for example, task ownership, delegation, escalation, and review) to the management of actions taken to correct plan problems associated with plan execution. Particular embodiments may allow planners to store plan problem records corresponding to plan problems, entities associated with such plan problems, or both. Particular embodiments may allow planners to increase the frequency of planning
sessions, which may result in increased responsiveness to plan problems. Particular embodiments may provide closed-loop problem management, which may provide a single, seamless solution bringing together supply chain planning and supply chain execution management. In particular embodiments, planners may manage planning decisions, actions, and monitoring of plan execution in a single paradigm.

In the Claims

4. Please amend the paragraphs appearing at Column 20, Lines 50-59, as indicated below:

The non-transitory computer-readable storage medium of Claim 26, wherein plan problem data associated with a plan problem comprises a plan problem record comprising data reflecting one or more of:

a nature of the plan problem;
when the plan problem first occurred;
a current status of the plan problem;
a status history of the plan problem;
action taken to correct the plan problem;
expected results of action taken to correct the plan problem;
actual results of action taken to correct the plan problem; and
action yet to be taken to correct the plan problem.